(12) United States Patent
Lin et al.

(10) Patent No.: US 9,898,184 B2
(45) Date of Patent: Feb. 20, 2018

(54) OPERATION METHOD OF OPERATING SYSTEM

(71) Applicant: ASUSTeK COMPUTER INC., Taipei (TW)

(72) Inventors: Hao-Ping Lin, Taipei (TW); Meng-Ju Lu, Taipei (TW)

(73) Assignee: ASUSTeK COMPUTER INC., Taipei (TW)

(*) Notice: Subject to any disclaimer, the term of this patent is extended or adjusted under 35 U.S.C. 154(b) by 556 days.

(21) Appl. No.: 13/865,203

(22) Filed: Apr. 18, 2013

(65) Prior Publication Data

US 2014/0078081 A1 Mar. 20, 2014

Related U.S. Application Data

(60) Provisional application No. 61/700,913, filed on Sep. 14, 2012.

(30) Foreign Application Priority Data

Nov. 22, 2012 (TW) .............................. 101143697 A

(51) Int. Cl.
*G06F 3/048* (2013.01)
*G06F 3/0481* (2013.01)
*G06F 3/0482* (2013.01)
*G06F 3/0483* (2013.01)
*G06F 3/0484* (2013.01)
*G06F 3/0488* (2013.01)

(52) U.S. Cl.
CPC .......... *G06F 3/0488* (2013.01); *G06F 3/0482* (2013.01); *G06F 3/04883* (2013.01); *G06F 3/04886* (2013.01)

(58) Field of Classification Search
USPC ......... 345/173–178; 178/18.01–18.09, 18.11
See application file for complete search history.

(56) References Cited

U.S. PATENT DOCUMENTS 8,171,417 B2 5/2012 Bamford et al.
2010/0137027 A1* 6/2010 Kim .................... G06F 3/03547
455/556.1
2011/0055773 A1 3/2011 Agarawala et al.
(Continued)

FOREIGN PATENT DOCUMENTS

CN 102207788 A 10/2011
TW 200945168 A 11/2009

*Primary Examiner* — Jeffrey S Steinberg
(74) *Attorney, Agent, or Firm* — CKC & Partners Co., Ltd.

(57) ABSTRACT

An operation method of an operating system, applied to an electronic device. The electronic device includes a touchpad and a screen. The touchpad has a first edge. The electronic device is used for executing the operating system. The screen is used for displaying a display image outputted by the operating system. A cursor is displayed at the display image. The operation method of the operating system comprises: determining whether a touch operation is a sliding gesture sliding from an edge when the touchpad senses the touch operation; determining which edge of the touchpad is sliding from by the sliding gesture if the touch operation is the sliding gesture sliding from the edge; displaying a charm bar in a first area of the display image and displaying the cursor on the charm bar if the sliding gesture slides from the first edge.

1 Claim, 11 Drawing Sheets

(56) References Cited

U.S. PATENT DOCUMENTS

| | | | |
|---|---|---|---|
| 2011/0209088 A1* | 8/2011 | Hinckley | G06F 3/0488 |
| | | | 715/810 |
| 2011/0209093 A1* | 8/2011 | Hinckley | G06F 3/04817 |
| | | | 715/834 |
| 2012/0157166 A1* | 6/2012 | Kim | G06F 21/6218 |
| | | | 455/566 |
| 2012/0179970 A1 | 7/2012 | Hayes | |
| 2012/0299814 A1* | 11/2012 | Kwon | H04M 1/72583 |
| | | | 345/156 |
| 2013/0254705 A1* | 9/2013 | Mooring | G06F 3/0488 |
| | | | 715/784 |
| 2015/0067601 A1* | 3/2015 | Bernstein et al. | 715/823 |

\* cited by examiner

OPERATION METHOD OF OPERATING SYSTEM

CROSS-REFERENCE TO RELATED APPLICATION

This application claims the priority benefit of U.S. provisional application Ser. No. 61/700,913, filed on Sep. 14, 2012 and Taiwan application serial No. 101143697 filed on Nov. 22, 2012. This entirety of the above-mentioned patent applications are hereby incorporated by reference herein and made a part of specification.

BACKGROUND OF THE INVENTION

Field of the Invention

The disclosure relates to an operation method of an operating system and, more particularly, to an operation method of an operating system applied to an electronic device with a touchpad and a screen.

Description of the Related Art

Besides the Desktop operating mode, the operating system also can operate in the metro operating mode. The metro operating mode has an interface including a plurality of live tiles which may be taken as different application programs or instant messages such as share prices, E-mail, or the weather forecast. All the messages are displayed at one screen, and a used can quickly find the needed program or message.

The metro operating mode is mainly designed for the user interface without a keyboard and a mouse cursor, such as a mobile phone, a table computer, a game box, and a big plane display device, and they can be controlled by touches, voices or gestures.

However, currently, when users use the operating system of a computer with the touchpad and switch the operating mode from one to another, following problems arise:

(1) when a user slides from the right edge of the touchpad with one finger, although the screen displays the charm bar, the cursor still has a distance to the charm bar, so the user needs to slide the cursor to the charm bar again, which is rather inconvenient; and (2) if the user slides from the left edge of the touchpad with one finger when no application program is running in the second operating mode on the operating system, the two operating modes would not have any response, and the user may feel confused whether the operating system is abnormal.

BRIEF SUMMARY OF THE INVENTION

An operation method of an operating system is provided. The operation method of the operating system is applied to an electronic device. The electronic device includes a touchpad and a screen. The touchpad has a first edge. The electronic device is used for executing the operating system. The screen is used for displaying a display image outputted by the operating system. A cursor is displayed in the display image. The operation method of the operating system includes the following steps: determining whether a touch operation is a sliding gesture sliding from an edge when the touchpad senses the touch operation; determining which edge of the touchpad the sliding gesture slides from if the touch operation is the sliding gesture sliding from the edge; displaying a charm bar in a first area of the display image and displaying the cursor on the charm bar if the sliding gesture sliding from the first edge.

The operation method of the operating system provided can solve the problem of the prior art. That is to say, according to the operation method of the operating system, the cursor can be synchronously moved to the charm bar after the instruction of displaying the charm bar is executed, which can increase the convenience in using the charm bar. Furthermore, the operating system can be quickly switched among the first operating mode and application programs running in the second mode, and users would not be confused that the operating system is abnormal. Moreover, it defines new functions to the sliding gestures which do not have corresponding functions in the conventional two operating mode, respectively, so as to increase the versatility and convenience of the operating system.

DETAILED DESCRIPTION OF THE EMBODIMENTS

These and other features, and advantages of the disclosure will become better understood with regard to the following description, appended claims, and accompanying drawings.

Figure 1:
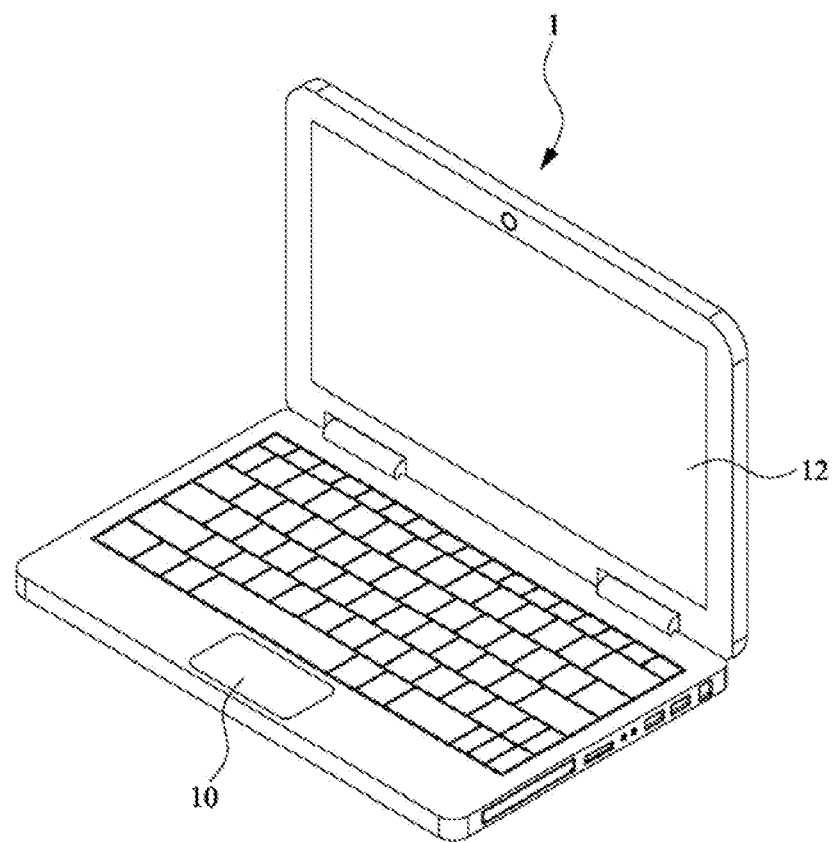
FIG. 1A is a three-dimensional schematic diagram of an electronic device applying to an operating system in an embodiment of the disclosure.
FIG. 1B is a schematic diagram showing the touchpad in FIG. 1A.
FIG. 1C is a schematic diagram showing an display image outputted by a screen when the operating system operates in a first operating mode in an embodiment of the disclosure.
FIG. 1D is a schematic diagram showing the display image outputted by the screen when the operating system operates in a second operating mode in an embodiment of the disclosure.
Figure 1B:
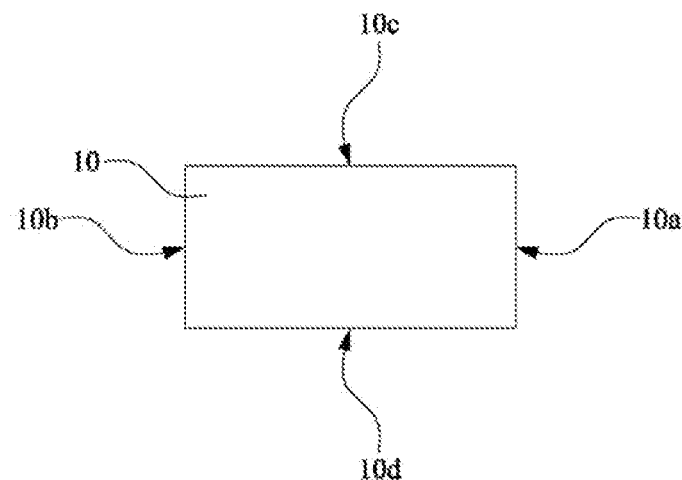
Figure 1C:
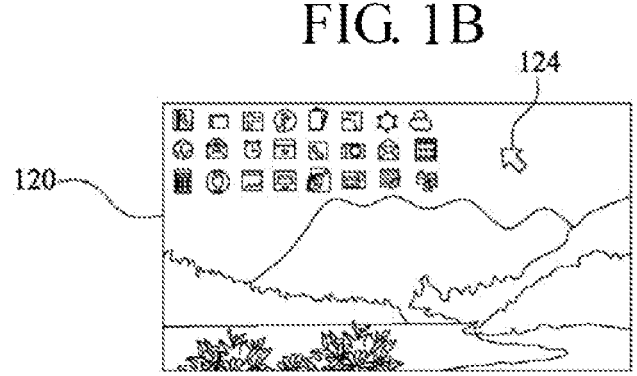
Figure 1D:
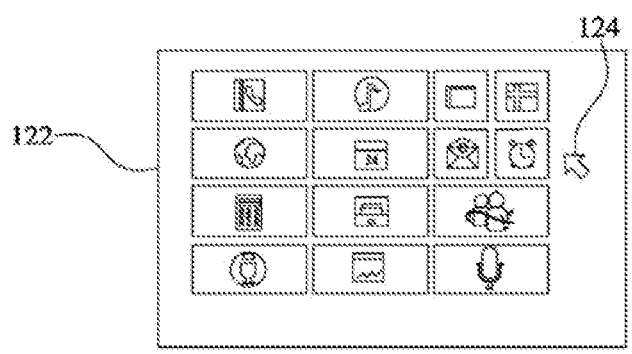

Please refer to FIG. 1A, FIG. 1B, FIG. 1C, and FIG. 1D. FIG. 1A is a three-dimensional schematic diagram of an electronic device applying to an operating system in an embodiment of the disclosure. FIG. 1B is a schematic diagram showing the touchpad in the FIG. 1A. FIG. 1C is a schematic diagram showing a display image outputted by a screen when the operating system operates in a first operating mode in and embodiment of the disclosure. FIG. 1D is a schematic diagram showing the display image outputted by the screen when the operating system operates in a second operating mode in an embodiment of the disclosure.

As shown in FIG. 1A and FIG. 1B, an electronic device 1 at least includes a touchpad 10 and the screen 12. The touchpad 10 has a first edge 10a, a second edge 10b, a third edge 10c, and a fourth edge 10d. The first edge 10a and the second edge 10b of the touchpad 10 are at the opposite sides of the touchpad 10 respectively. The third edge 10c and the fourth edge 10d are at two sides of the first edge 10a and the second edge 10b, respectively.

For example, the first edge 10a and the second edge 10b are the right side edge and the left side edge of the touchpad 10 respectively, and the third edge 10c and the fourth edge 10d are the upside edge and the downside edge respectively. The disclosure is not limited thereto.

As showed in FIG. 1C and FIG. 1D, the operating system applied by the electronic device 1 can be run in a first operating mode or a second operating mode alternatively. In the embodiment, the first operating mode is a "desktop" operating mode, and the second operating mode is a "Live Tile" operating mode. The disclosure is not limited thereto.

The screen 12 of the electronic device 1 is for displaying a display image outputted by the operating system. As shown in FIG. 1C, when the operating system operates in the first operating mode, the display image displayed by the screen 12 is a first mode image 120. As shown in FIG. 1D, when the operating system operates in the second operating mode, the display image displayed by the screen 12 is a second mode image 122. Both of the first mode image 120 and the second mode image 122 have a cursor 124.

In the embodiment, a notebook computer is taken as an example of the electronic device 1, which is not limited herein. In other embodiments, the operation method of the operating system also can be applied to other portable electronic devices, such as an ultra-book or a netbook. In other words, the electronic devices can apply the operation method of the operating system as long as it can run the operating system and have a touchpad and a screen.

Figure 2:
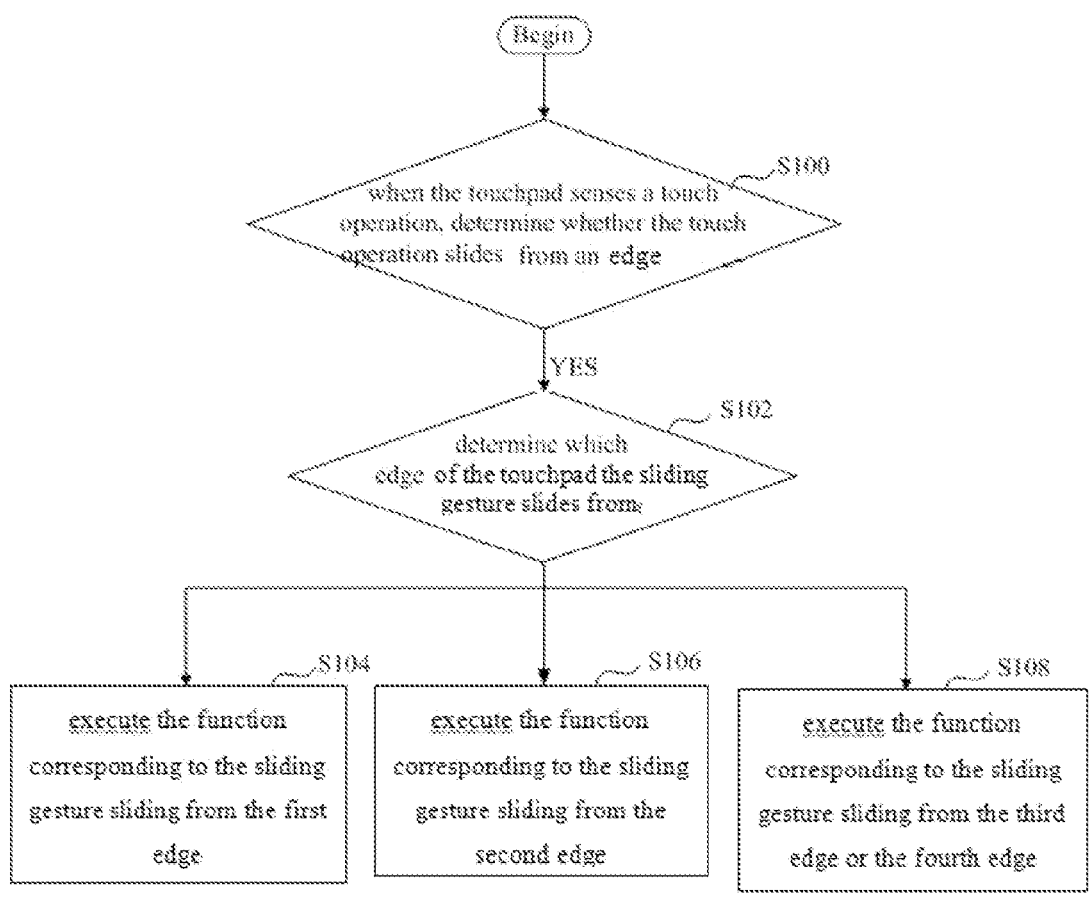
FIG. 2 is a flowchart showing an operating method of the operating system according to an embodiment of the disclosure.

Please refer to FIG. 2. FIG. 2 is a flowchart showing the operation method of the operating system according to an embodiment of the disclosure.

As shown in FIG. 2, the operation method of the operating system includes the step S100 to step S108.

Step S100: when the touchpad 10 senses a touch operation, determining whether the touch operation slides from an edge.

If the sensed touch operation is not a sliding gesture (for example, it is a common click touch operation), the electronic device 1 does not completely execute the step S100. That is, the electronic device 1 does not further determine whether the touch operation is a sliding gesture sliding from an edge.

If the sensed touch operation is a sliding gesture, the electronic device 1 completely executes the step S100. That is, the electronic device 1 further determines whether the touch operation is a sliding gesture sliding from an edge of the touchpad 10, and executes the step S102.

Step S102: determining which edge of the touchpad 10 the sliding gesture slides from.

Then, step S104, S106, or S108 is further executed to increase the convenience and functionality of the electronic device 1 according to the edge of the touchpad 10 the sliding gesture slides from.

Step S104: executing the function corresponding to the sliding gesture sliding from the first edge 10a.

Step S106: executing the function corresponding to the sliding gesture sliding from the second edge 10b.

Step S108: executing the function corresponding to the sliding gesture sliding from the third edge 10c or the fourth edge 10d.

Figure 3:
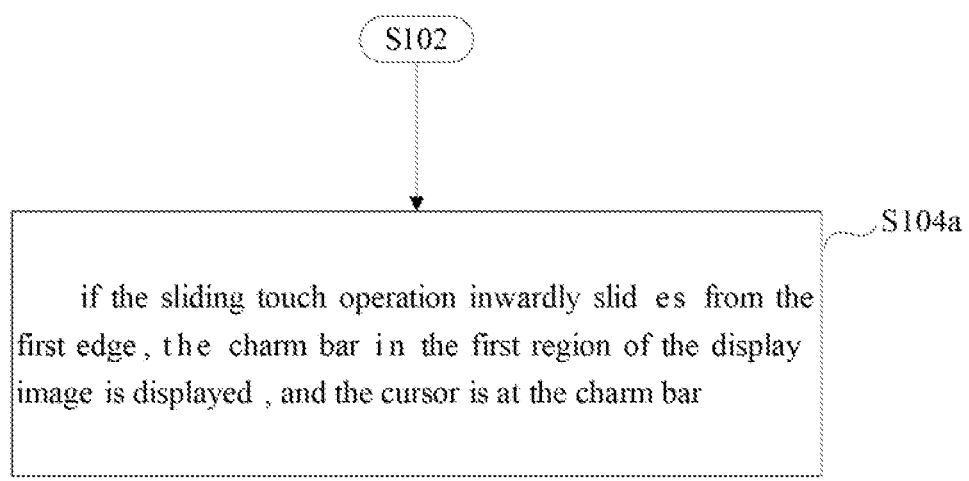
FIG. 3 is a detailed flowchart showing part of the operation method of the operating system in the FIG. 2.
Figure 4:
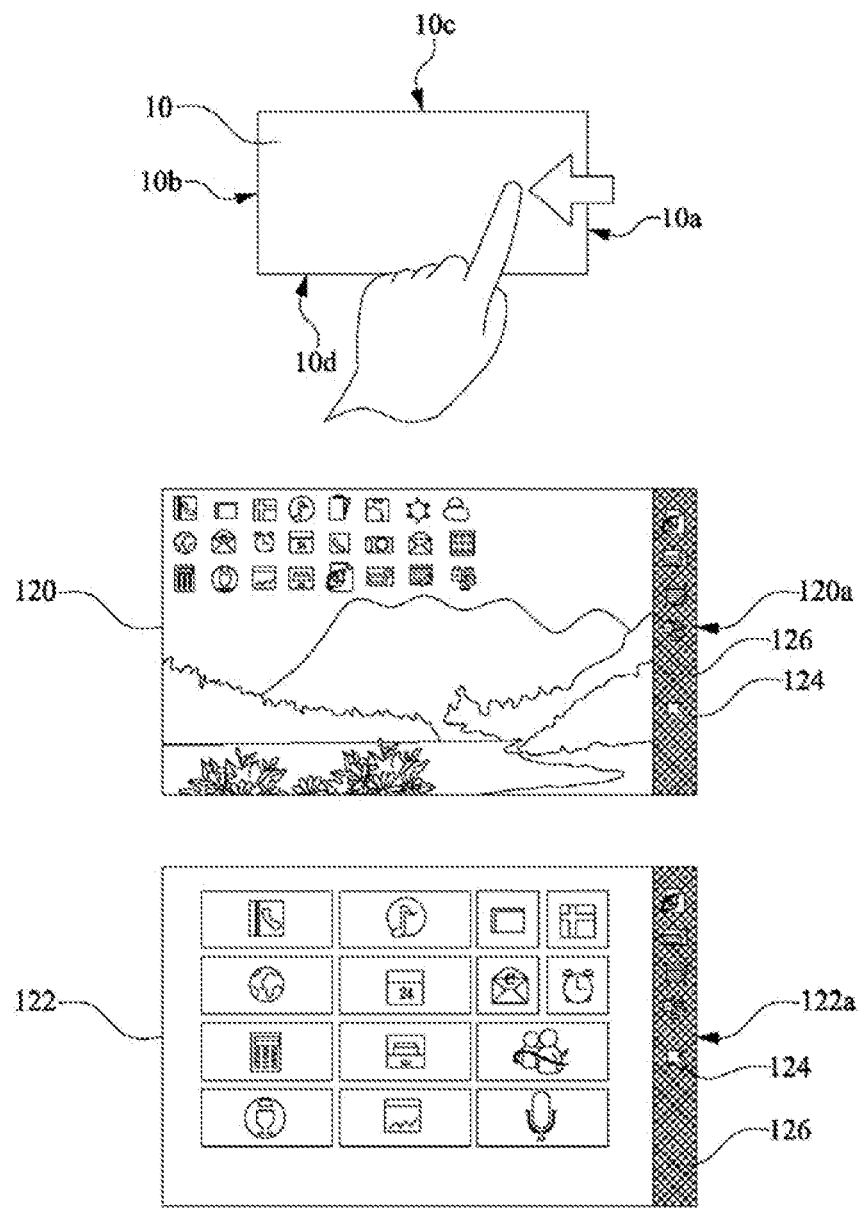
FIG. 4 is a schematic diagram showing an electronic device using the operation method of the operating system in the FIG. 2.

Please refer to FIG. 3 and FIG. 4. FIG. 3 is a detailed flowchart showing part of the operation method of the operating system in the FIG. 2. FIG. 4 is a schematic diagram showing an electronic device using the operation method of the operating system in the FIG. 2.

As shown in FIG. 3, the step S104 (that is, executing the function corresponding to the sliding gesture sliding from the first edge 10a) of the operation method of the operating system includes the step S104a.

In Step S104a, if the sliding gesture is executed from the first edge 10a, the charm bar 126 is displayed in the first areas 120a, 122a of the display image, and the cursor 124 is at the charm bar 126.

As shown in FIG. 4, in the embodiment, both the first area 120a of the display image (that is, the first mode image 120) corresponding to the first operating mode and the first area 122a of the display image (that is, the second mode image 122) corresponding to the second operating mode are located at the right side of the screen. The disclosure is not limited thereto.

According to the operation method of the operating system, no matter the operating system operates in the first operating mode or the second operating mode, users can synchronously move the cursor 124 to the charm bar 126 (as shown in FIG. 4) after the instruction for sowing the charm bar 126 is executed (that is, users perform the sliding gesture sliding from the first edge 10a), and thus it can increase the convenience in using the charm bar 126.

Figure 5:
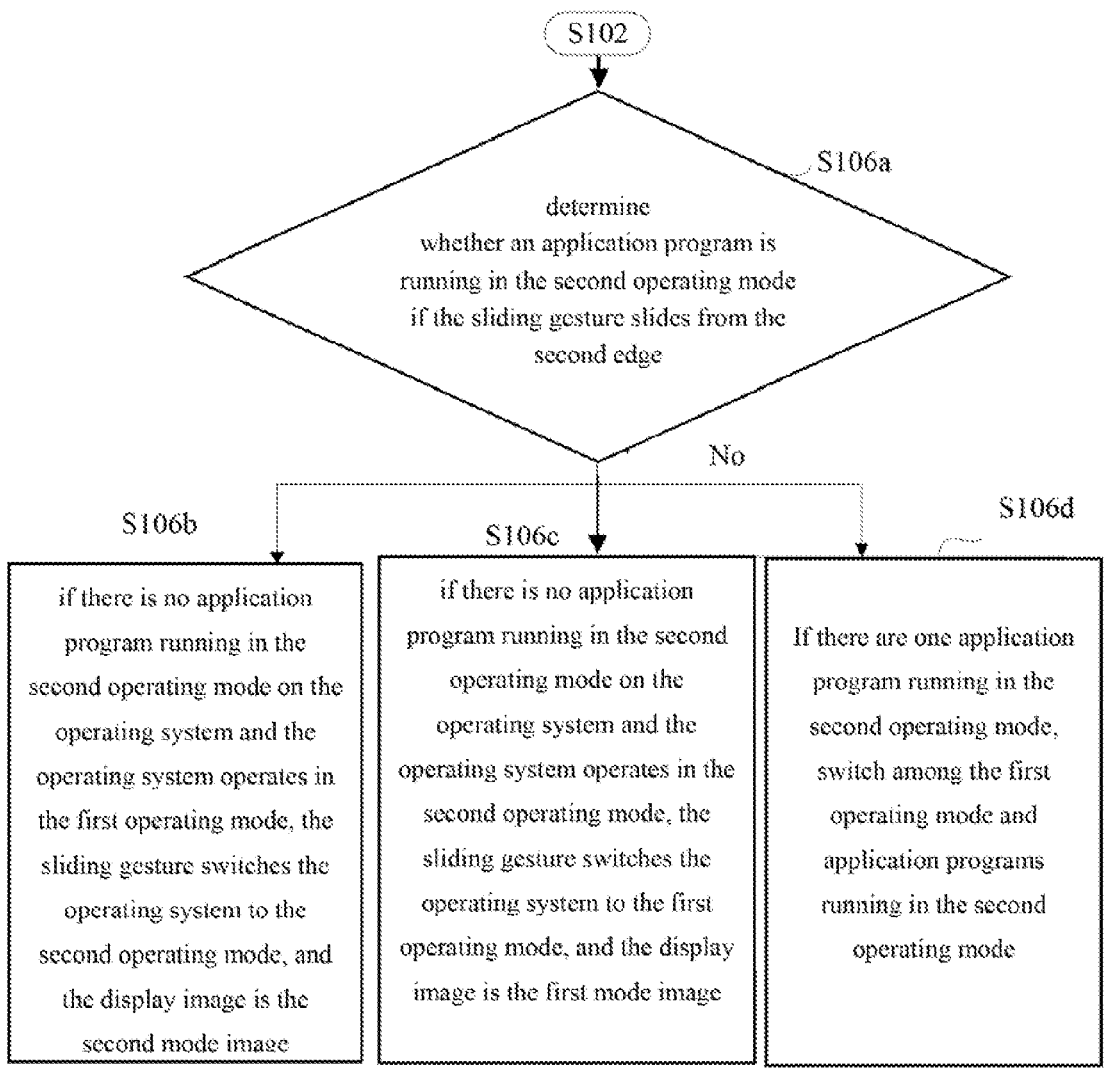
FIG. 5 is a detailed flowchart of another part of the operation method of the operating system in the FIG. 2.
Figure 6:
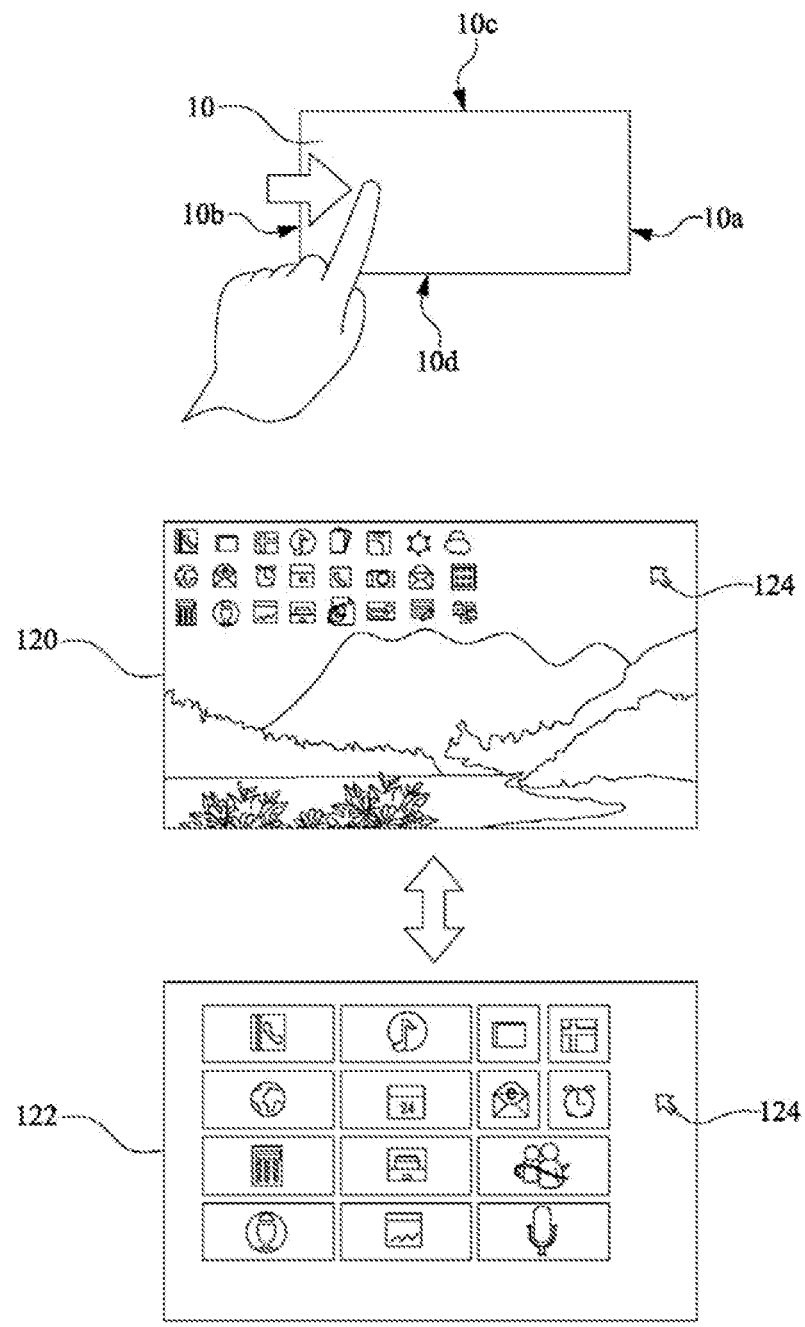
FIG. 6 is a schematic diagram showing an electronic device using the operation method of the operating system in FIG. 5.

Please refer to FIG. 5 and FIG. 6. FIG. 5 is a detailed flowchart of another part of the operation method of the operating system in the FIG. 2. FIG. 6 is a schematic diagram showing an electronic device using the operation method of the operating system in FIG. 5.

As shown in FIG. 5, in the embodiment, the step S106 of the operation method of the operating system (that is, executing the function corresponding to the sliding gesture sliding from the second edge 10b) includes the detailed steps from step S106a to step S106c.

Step S106a: determining whether there is an application program running in the second operating mode on the operating system if the sliding gesture slides from the second edge 10b.

The program which can be executed by the operating system at least includes system programs (such as the desktop program of the first operating mode or the second operating mode) and application programs (such as browser, E-mail software, communication software). The system program provides the operating environment for the application program. The application program and the system program must operate in coordination and the application program can be started or ended selectively.

If the determine result of the step S106a is "NO" (that is to say, there is no application program running in the second operating mode on the operating system except system programs), the electronic device 1 further executes the steps S106b and S106c.

In Step S106b, if there is no application program running in the second operating mode on the operating system and the operating system operates in the first operating mode, the sliding gesture switches the operating system to the second operating mode, and the display image is the second mode image 122.

In Step S106c, if there is no application program running in the second operating mode on the operating system and the operating system operates in the second operating mode, the sliding gesture switches the operating system to the first operating mode, and the display image is the first mode image 120.

In Step S106d, if there are one or more application programs running in the second operating mode on the operating system, the sliding gesture switches among the first operating mode and application programs running in the second operating mode.

Therefore, via the operation method of the operating system, users can quickly switch the operating system to the first operating mode or the second operating mode via the sliding gesture from the second edge 10b (as shown in FIG. 6), and the user would not be confused whether the operating system is abnormal.

Figure 7:
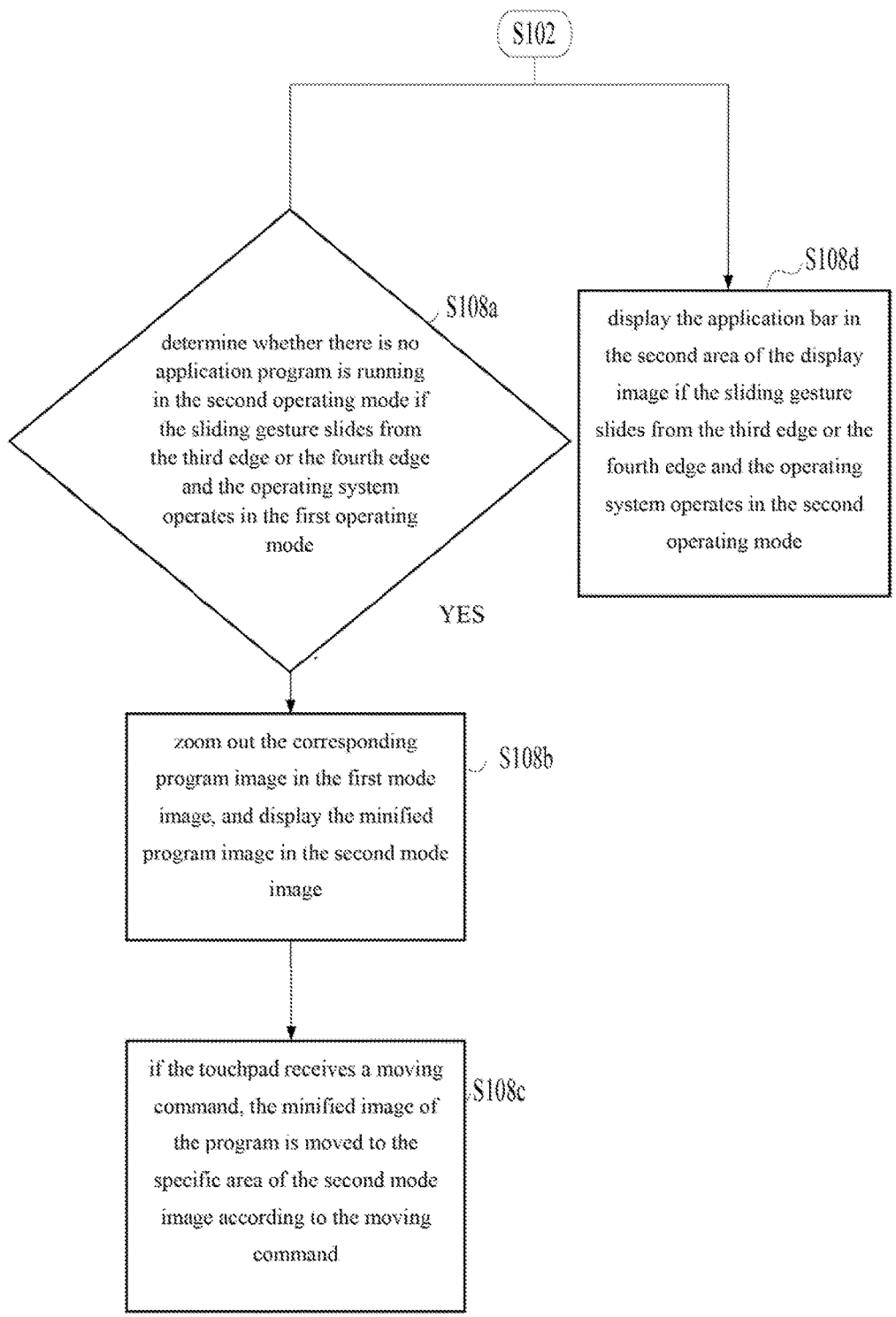
FIG. 7 is a detailed flowchart showing another part of the operation method of the operating system in the FIG. 2.
Figure 8:
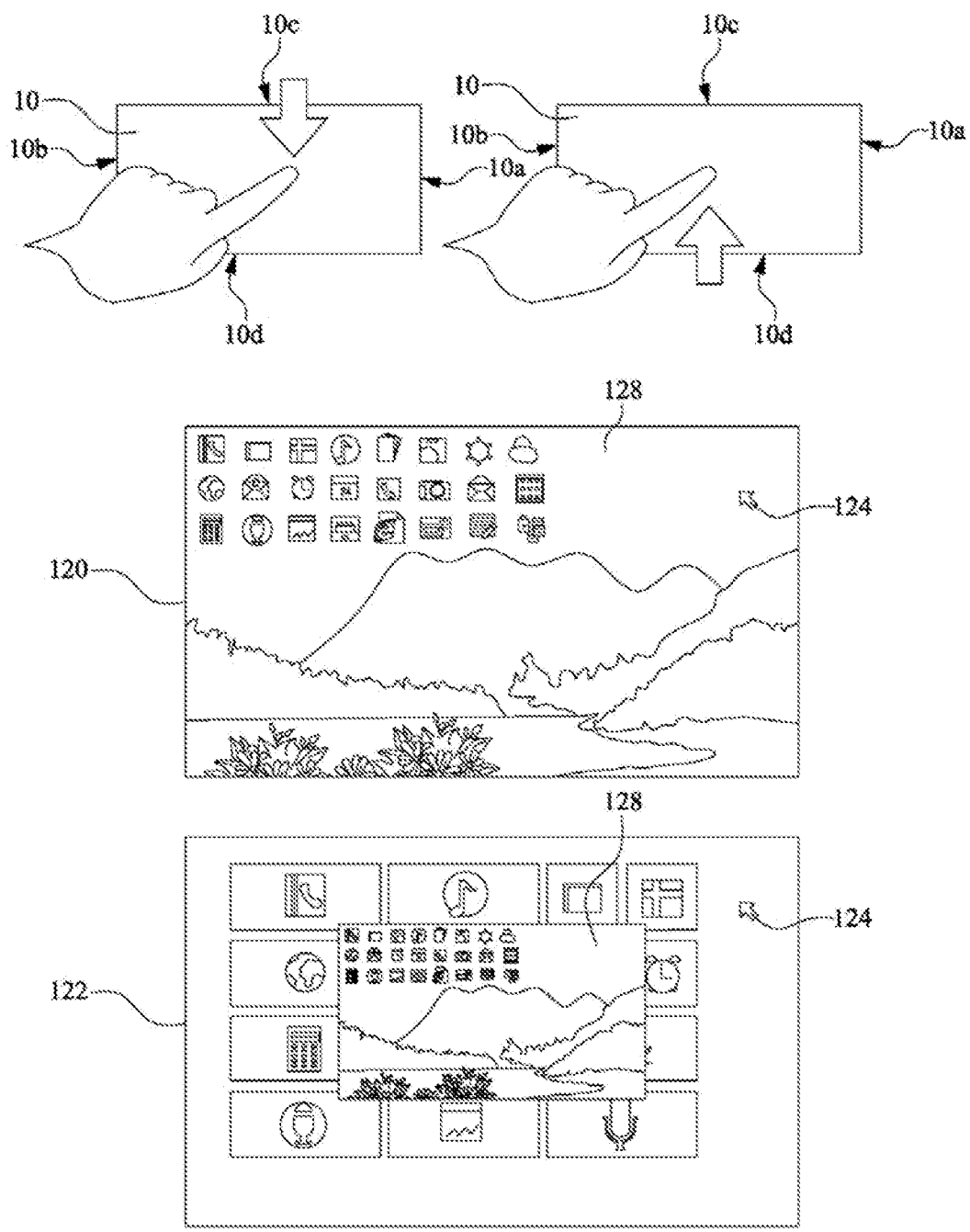
FIG. 8 is a schematic diagram showing an electronic device using the operating method of the operating system in FIG. 7.
Figure 9:
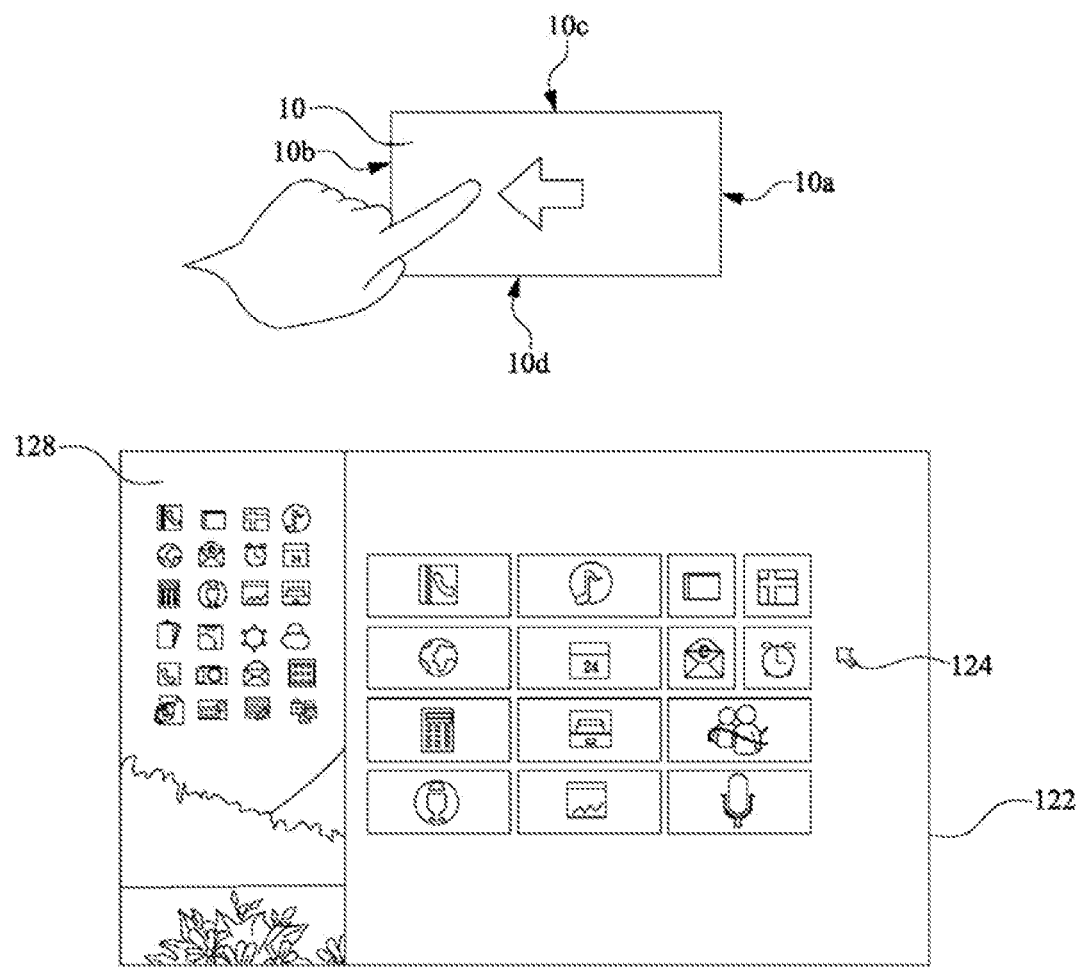
FIG. 9 is a schematic diagram showing another part of the electronic device using the operation method of the operating system in FIG. 7.
Figure 10:
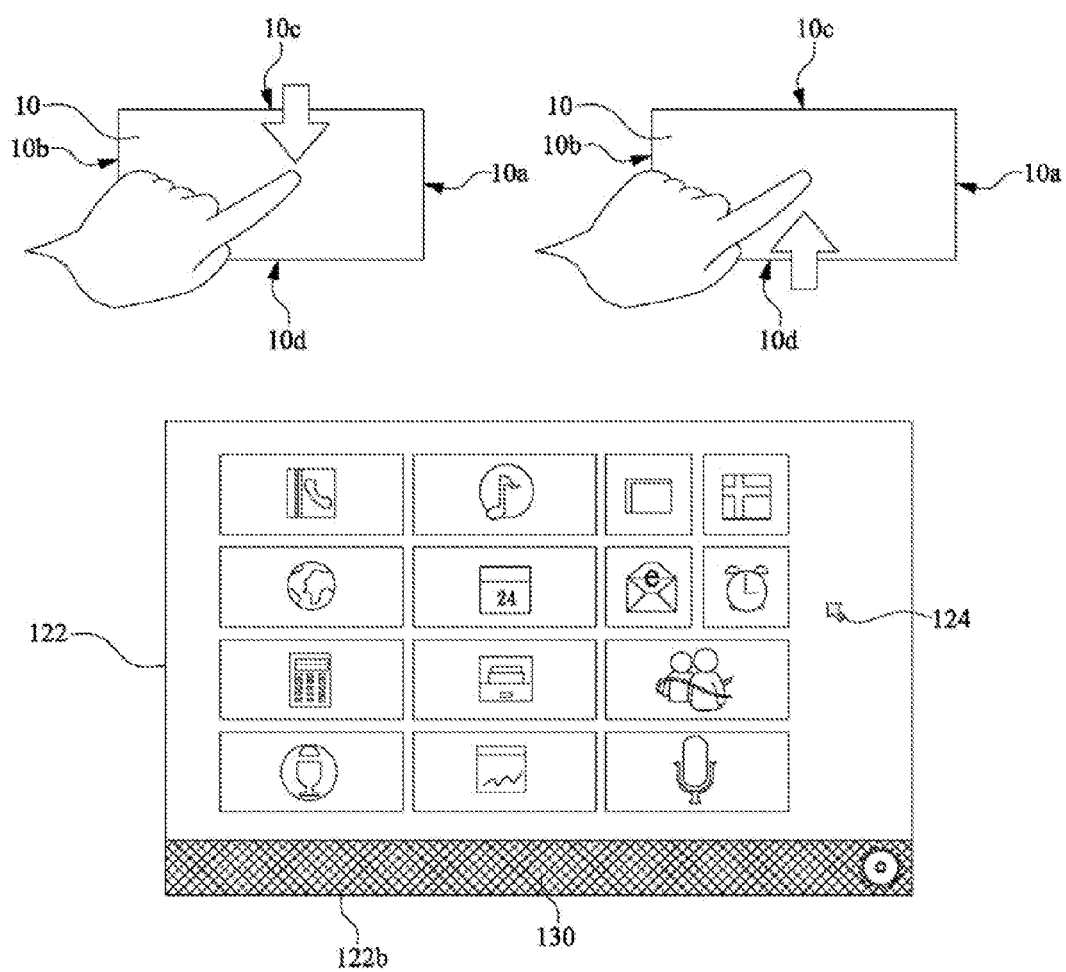
FIG. 10 is a schematic diagram showing further another part of the electronic device using the operation method of the operating system in FIG. 7.

Please refer to FIG. 7, FIG. 8, FIG. 9, and FIG. 10. FIG. 7 is a detailed flowchart showing another part of the operation method of the operating system in the FIG. 2. FIG. 8 is a schematic diagram showing an electronic device using the operation method of the operating system in FIG. 7. FIG. 9 is a schematic diagram showing another part of the electronic device using the operation method of the operating system in FIG. 7. FIG. 10 is a schematic diagram showing another part of the electronic device using the operation method of the operating system in FIG. 7.

As shown in FIG. 7, in the embodiment, the step S108 of the operation method of the operating system (that is, executing the corresponding function of the sliding gesture sliding from the third edge 10c or the fourth edge 10d) totally includes two step branches, one of which includes the steps S108a, S108b, and S108c.

Step S108a: determining whether there is no application program running in the second operating mode on the operating system if the sliding gesture slides from the third edge 10c or the fourth edge 10d and the operating system operates in the first operating mode.

The programs at the step S108a include system programs and application programs that can be run on the operating system. As shown in FIG. 8, when the operating system operates in the first operating mode, the first mode image 120 displayed by the screen 12 shows the desk program image 128 in the embodiment, which is not limited herein.

If the determine result of the step S108a is "YES", the step S108b is executed according to the operation method of the operating system.

Step S108b: zooming out the corresponding program image 128 in the first mode image 120, and displaying the minified program image 128 in the second mode image 122.

As shown in FIG. 8, the minified program image overlaps the second mode image 122, which is not limited herein.

After the step S108b, the operation method of the operating system further includes the step S108c.

Step S108c: if the touchpad 10 receives a moving command, the minified image 128 of the program is moved to the specific area of the second mode image 122 according to the moving command.

As shown in FIG. 9, the moving command is a single-finger slide operation sliding to the second edge 10b of the touchpad 10, so the minified program image 128 is moved to the left side of the second mode image 122 according to the moving command. In the embodiment, when the minified program image 128 is moved to the left side of the second mode image 122, the length-width ratios of the program image 128 and the second mode image 122 are re-adjusted to present the function of the Picture in Picture, which is not limited herein.

Therefore, via the operation method of the operating system, when the operating system operates in the first operating mode, users can zoom out the foreground program image 128 in the first mode image 120 via the sliding gesture from the third edge 10c or the fourth edge 10d (as shown in FIG. 9), and they also can move the minified program image 128 to the specific area of the second mode image 122 by the subsequent moving command (as shown in FIG. 9). The method can increase the versatility and convenience of the operating system which operates in the first operating mode.

As shown in FIG. 7, the other step branch of the step S108 of the operation method of the operating system include the step S108d.

Step S108d: displaying the application bar 130 in the second area 122b of the display image if the sliding gesture slides from the third edge 10c or the fourth edge 10d and the operating system operates in the second operating mode.

As shown in FIG. 10, in the embodiment, the second area 122b of the corresponding second mode image 122 of the second operating mode is near the bottom edge, which is not limited herein.

Therefore, via the operation method of the operating system, when the operating system operates in the second operating mode, users can make the application bar 130 displayed in the second are 122b of the display image via the sliding gesture from the third edge 10c or the fourth edge 10d (as shown in FIG. 10), so as to increase the versatility and convenience of the operating system which is operating in the second operating mode.

In sum up, according to the operation method of the operating system in embodiments, the cursor can be synchronously moved to the charm bar after the instruction of displaying the charm bar is executed, which can increase the convenience in using the charm bar. Furthermore, the operating system can be quickly switched between the two modes, and users would not be confused that the operating system is abnormal. Moreover, it defines new functions to the sliding gestures which do not have corresponding functions in the conventional two operating modes, respectively, so as to increase the versatility and convenience of the operating system.

Although the disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An electronic device including an operating system for selectively operating in a first operating mode and a second operating mode, the electronic device comprising:
   a screen configured to display a displaying image outputted by the operating system, wherein the displaying image is a first mode image in the first operating mode and is a second mode image in the second operating mode; and
   a touchpad comprising a first edge, a second edge opposite to the first edge, a third edge extending between opposing ends of the first and second edges, and a fourth edge opposite to the third edge;
   wherein the electronic device is configured to:

in response to detecting a sliding gesture that slides from the first edge of the touchpad, display a charm bar on the displaying image and a cursor on the charm bar;

in response to detecting a sliding gesture that slides from any position of the second edge of the touch pad, switch the first operating mode to the second operating mode when there is no application program running in the second operating mode;

in response to detecting a sliding gesture that slides from the third edge of the touch pad, zoom out a program image corresponding to a program in the first mode image and display a resulting minified program image in the second mode image; and in response to detecting a sliding gesture that slides from the fourth edge of the touch pad, display an application bar in the display image when the operating system operates in the second operating mode.

* * * * *